US006931522B1

(12) United States Patent
Raghavan et al.

(10) Patent No.: US 6,931,522 B1
(45) Date of Patent: Aug. 16, 2005

(54) METHOD FOR A COMPUTER USING THE SYSTEM IMAGE ON ONE OF THE PARTITIONS TO BOOT ITSELF TO A KNOWN STATE IN THE EVENT OF A FAILURE

(75) Inventors: Kartik N. Raghavan, Seattle, WA (US); Ryan W. J. Waite, Seattle, WA (US); Thomas G. Phillips, Bellevue, WA (US); Paul C. Sutton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 09/713,108

(22) Filed: Nov. 15, 2000

Related U.S. Application Data

(60) Provisional application No. 60/168,048, filed on Nov. 30, 1999.

(51) Int. Cl.[7] ................. G06F 9/455; G06F 15/177
(52) U.S. Cl. ...................... 713/2; 714/14; 714/36
(58) Field of Search ..................... 713/2; 714/14, 714/36; 711/173

(56) References Cited

U.S. PATENT DOCUMENTS

| | | | | |
|---|---|---|---|---|
| 5,410,699 A | * | 4/1995 | Bealkowski et al. ........... | 713/2 |
| 5,432,927 A | | 7/1995 | Grote et al. | |
| 5,692,190 A | * | 11/1997 | Williams ..................... | 713/2 |
| 5,708,776 A | | 1/1998 | Kikinis | |
| 5,787,491 A | * | 7/1998 | Merkin et al. ............... | 711/173 |
| 5,802,363 A | | 9/1998 | Williams et al. | |
| 6,098,158 A | * | 8/2000 | Lay et al. .................... | 711/162 |
| 6,158,002 A | * | 12/2000 | Kwan et al. .................. | 713/2 |
| 6,170,055 B1 | * | 1/2001 | Meyer et al. ................. | 713/2 |
| 6,289,449 B1 | * | 9/2001 | Aguilar et al. ............... | 713/2 |
| 6,304,965 B1 | * | 10/2001 | Rickey ........................ | 713/2 |
| 6,308,264 B1 | * | 10/2001 | Rickey ........................ | 713/2 |
| 6,308,265 B1 | * | 10/2001 | Miller ......................... | 713/2 |
| 6,347,371 B1 | * | 2/2002 | Beelitz et al. ................ | 713/2 |
| 6,381,694 B1 | * | 4/2002 | Yen ............................. | 713/2 |
| 6,449,716 B1 | * | 9/2002 | Rickey ........................ | 713/2 |
| 6,535,977 B1 | | 3/2003 | Holle et al. | |
| 6,560,701 B1 | * | 5/2003 | Berstis et al. ................ | 713/2 |
| 6,578,068 B1 | | 6/2003 | Bowman-Amuah | |
| 6,591,376 B1 | * | 7/2003 | VanRooven et al. ......... | 714/36 |
| 6,658,563 B1 | * | 12/2003 | Ice et al. ..................... | 713/2 |
| 2002/0091805 A1 | | 7/2002 | Phillips et al. | |

FOREIGN PATENT DOCUMENTS

| | | |
|---|---|---|
| EP | 0 917 060 A1 | 5/1999 |
| WO | WO 95/22794 | 8/1995 |

OTHER PUBLICATIONS

Stevens et al, "El–Torito": Bootable CD–ROM Format Specification Version 1.0, Phoenix Technologies and IBM, pp. 1–20 (1994).

Lawson, M., et al., "Reconfiguration Techniques of a Mobile Network", *in Proceedings of the 1980 International Zurich Seminar on Digital Communications, IEEE Catalog No. 80CH1521–4*, pp. B10.1–B 10.4 (Mar. 1980).

Burns, A., et al., "Dynamic Change Management and Ada", *Journal of Software Maintenance: Research and Practice*, vol. 1, No. 2, pp. 121–131 (Dec. 1989).

Banker, R., et al., "A Field Study of Scale Economies in Software Maintenance", *Management Science*, vol. 43, No. 12, pp. 1709–1725 (Dec. 1997).

\* cited by examiner

*Primary Examiner*—Chun Cao
(74) *Attorney, Agent, or Firm*—Leydig, Voit & Mayer

(57) ABSTRACT

A method and system for booting a computer system to a known state at system start-up or in the event of an error or failure while the system is running or operating. The method and system of the invention automatically executes all the necessary procedures to boot the computer system to a known state, without any human intervention. The invention uses information about the state of the computer system during previous boot attempts to determine the logical steps performed to ensure that the system boots to a known state.

62 Claims, 8 Drawing Sheets

[KR] I would use: El-Torito complaint program module for box 120

Shutdown Sequence

METHOD FOR A COMPUTER USING THE SYSTEM IMAGE ON ONE OF THE PARTITIONS TO BOOT ITSELF TO A KNOWN STATE IN THE EVENT OF A FAILURE

RELATED APPLICATIONS

This application claims priority from U.S. provisional application Ser. No. 60/168,048 filed on Nov. 30, 1999, entitled "Recovery Infrastructure for Server Appliances."

TECHNICAL FIELD

This invention relates generally to computer recoverability and reliability and, more particularly, relates to a method and system for booting a computer to a known state either at start-up or in the event of a system failure.

BACKGROUND OF THE INVENTION

In a typical network environment, there is an increasing use of appliance servers. The term "appliance server" generally refers to servers that have been reduced to smaller, less expensive forms which do not require, for example, a monitor, mouse or keyboard. Typically, the operating system and particular application running on the appliance server are loaded and configured at the factory and the device is ready to use when received by the customer. Appliance servers are used as, for example, web content servers, caching servers or network-attached storage.

Because an appliance server may not be connected to any input or output devices such as a monitor, mouse or keyboard, often a user may not know if the server has experienced an error or failure. Even if a user is able to determine if the server has experienced an error or failure, restoring the server to a known state requires the user to undertake a complicated and time consuming recovery procedure. Because appliance servers are designed to be ready for use when received by a customer, the customer may not have the specific skills or knowledge to perform any required diagnostic or recovery procedures.

Typical server recovery procedures include using a backup program or a "mirroring" technique, both of which are known to those skilled in the art. These techniques, however, involve either extensive and time consuming manual user intervention or custom and expensive hardware solutions. These recovery techniques can be made even more difficult and time consuming because the server may not have a keyboard or monitor and, thus, the user may not be able to perform diagnostics on, or communicate with, the server. Significantly, these techniques require manual user intervention and configuration to restore the failed server to a known state.

If a computer system has a hard disk with multiple partitions, utilities are available that allow a user to decide during the boot procedure which partition on the hard disk should be designated as the active partition. For example, a user may have a hard disk with multiple partitions, each containing a different operating system. Using one of these available utilities, a user can decide during the boot procedure which operating system to run by selecting the active partition. With such an arrangement, however, the boot process cannot be completed without user intervention and decision making. Additionally, such an arrangement does not provide any enhanced level of reliability or recoverability. A computer system including such an arrangement may still experience errors or failures that prevent it from successfully booting to a known state and the system is incapable of automatically booting to a known state in case of such an error or failure. For example, if a computer virus corrupts the Master Boot Record on the hard disk of the computer, the system will not be able to boot because the data on the hard disk will be inaccessible.

SUMMARY OF THE INVENTION

The present invention provides a computer system that boots to a known state at start-up or in the event of an error or failure while the system is running or operating, and the corresponding method thereof. Once the computer system is turned-on, or a reset switch or command is activated or implemented in case of an error, all necessary procedures are automatically executed to boot the system to a known state without human intervention. The invention improves reliability and recoverability of computer systems without requiring expensive hardware solutions or requiring a user to undertake complicated or time consuming recovery procedures.

A series of logical steps are executed at boot time to determine the state of the computer system, e.g., whether any of the partitions on the hard disk that contain a copy of the system image are bootable. Based on this information, the computer system is booted to a known state from one of the partitions. If the computer system is not bootable from any of the partitions, the system image configuration is restored on the hard disk and the computer system is booted from the restored system image.

In accordance with one embodiment of the invention, the boot process is initiated from a bootable CD-ROM such as, for example, a CD-ROM that incorporates the El Torito boot format. Because a CD-ROM is a storage medium that is difficult to corrupt, initiating the boot process from the CD-ROM minimizes the possibility of an error or failure during the boot process.

The invention additionally utilizes a hard disk with at least two partitions, each partition containing a redundant copy of a system image. When the boot process is initiated from the CD-ROM, a logic file on the CD-ROM is accessed to determine the steps of the boot procedure that are executed by program modules that also reside on the CD-ROM. The first step in the boot process is to verify the integrity of the Master Boot Record (MBR) and the partitions on the hard disk. The MBR contains a map of the hard disk, i.e., the locations of the various partitions on the hard disk. If the hard disk has more than one partition, the MBR also indicates the active partition on the disk.

As the boot process continues, it is next determined whether there have been any past errors or failures when attempting to boot the computer system from partition P1, the active partition. This information is obtained from a text file, for example, bstate.txt, a copy of which is stored on the hard disk. The file bstate.txt contains values that indicate the result of previous boot attempts. If the previous boot attempt from partition P1 was successful, then the computer system will complete the boot process from partition P1. If the computer system cannot boot from partition P1, then partition P2 is designated as the active partition and is checked to determine whether it is bootable. If partition P2 is bootable, the computer system completes the boot process from the redundant copy of the system image stored on partition P2.

Finally, if the computer system cannot complete the boot process from any of the partitions on the hard disk, then recovery image and restoration tools on the CD-ROM are used to restore the system image on the hard drive. As part of this process, the hard drive is reformatted, then at least two partitions are recreated, and redundant copies of the system image are restored on the first and second partitions. Once the system image is restored on the hard disk, the computer system can re-execute the steps stated above to boot the system from one of the restored partitions.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
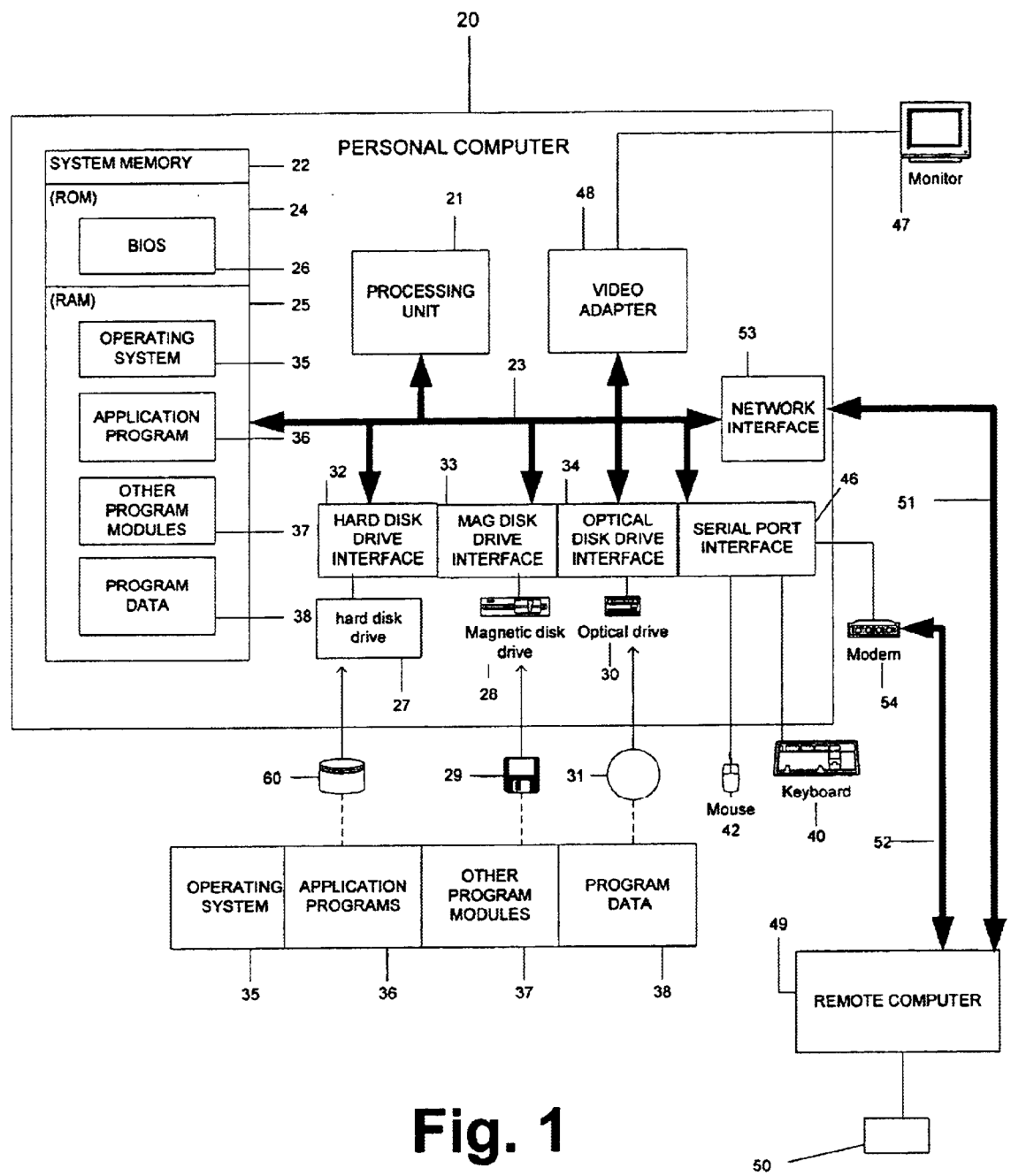
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD-ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, such as the one depicted in FIG. 1, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
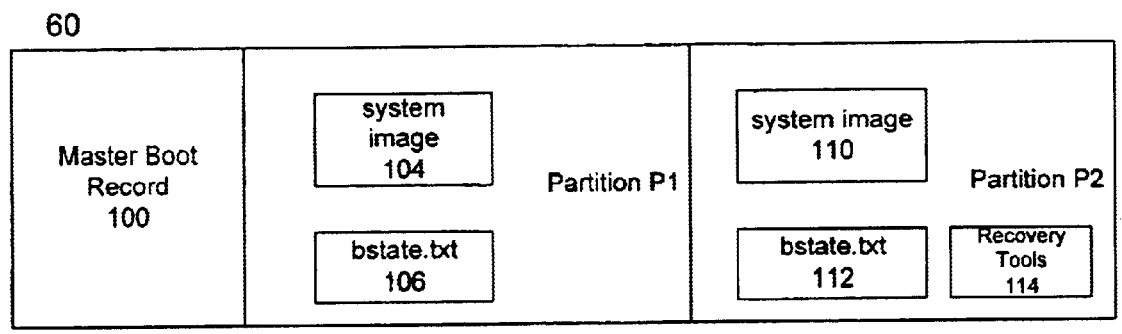
FIG. 2 is a schematic diagram of a hard disk illustrating an exemplary partitioning of the hard disk and the files stored thereon.

FIG. 2 is a schematic representation of the hard disk 60 of the system according to the invention. The hard disk 60 is comprised of the Master Boot Record (MBR) 100 and at least two partitions, hereby referred to as partition P1 and partition P2. The MBR 100 generally includes a map of the hard disk, including the locations of the partitions P1 and P2 on the hard disk 60, and information with respect to which partition is the active partition. For the purposes of this disclosure, it is assumed that partition P1 is the initially designated active partition, although either partition P1 or P2 can initially be designated as the active partition.

While the hard disk 60 represented in FIG. 2 has two partitions, the invention is equally applicable to a hard disk 60 with more or less than two partitions. The invention may also be implemented using more than one hard disk 60. In such an implementation, the partitions P1 and P2 may, but need not be, located on separate hard disks.

Partition P1 is the active partition and stores the primary system image 104 and a file named bstate.txt 106. It should be noted that the specific file names used in this application are merely exemplary and that the exact file names used are not critical to the invention. Partition P2 is the backup partition and stores a redundant copy 110 of the system image 104 stored on partition P1. By redundant, it is meant that the copy of the system image 110 is the same as the copy of the system image 104 in all material aspects. Thus, the system image 110 need not, but may, be an exact copy of the system image 104. Partition P2 also includes a redundant copy 112 of the file bstate.txt 106 on partition P1. Additionally, partition P2 may include recovery tools 114, which may be used to diagnose and repair any errors or failure on the hard disk 60 or any other additional hard disks which may be a part of the computer system 20.

The system images 104 and 110 on the partitions P1 and P2, respectively, may be copies of an operating system 35 configured to run the computer 20. The system image, however, may also be an application program 36 configured to run on the computer 20 or a combination of an operating system and application program configured to run on the computer 20. Thus, the invention can be used to automatically restore any program, module or data structure to a known state in case of a system error or failure.

In a preferred implementation of the invention, however, the operating system is stored on a separate hard disk than any application programs or application data. With such an implementation, the application data integrity may be maintained independent of any errors or failures experienced by the operating system running on the computer 20. A recovery procedure performed on a hard disk containing the operating system will not affect the application programs and data stored on a separate hard disk.

The boot process is initiated and controlled from a device external to the hard disk 60. In a preferred implementation of the invention, the boot process is initiated from a bootable CD-ROM using a CD-ROM drive 30. The CD-ROM may incorporate any bootable format specification. One such specification is the "El Torito" Bootable CD-ROM format specification, which provides for placing one or more bootable images on a CD and allows the personal computer 20 to select the desired bootable image. The *"El Torito" Bootable CD-ROM Format Specification*, version 1.0, dated Jan. 25, 1995, published by Pheonix Technologies and IBM is hereby incorporated by reference in its entirety. The invention, of course, is broad enough to encompass any future versions of the El Torito specification. In such an implementation, all the processes and logic of the boot process are controlled from program modules stored on a CD-ROM 31. The invention is not limited to an implementation using a bootable CD-ROM and, indeed, may be implemented using any device from which the computer system can initiate a boot process including, but not limited to, a hard disk, ROM, RAM, EPROM, DVD, bootable floppy disk, etc.

Booting the server from an optical drive 30, such as a CD-ROM drive, is advantageous because once information is encoded on a CD-ROM, it is unlikely that the information will be corrupted unless the CD-ROM is physically damaged. In this manner, the boot process can be initiated and controlled from a highly reliable source. Using a bootable CD-ROM also offers the additional advantage that the steps performed during the start-up or recovery process are easily modifiable. For example, different CD-ROMs may include different logic files for controlling the boot and/or recovery process. A user can easily change the steps performed by the computer system during start-up or system recovery by changing the CD-ROM used by the computer system. For example, if the hard disk 60 is configured to include more or less than two partitions, a new CD-ROM can be used with a logic file that includes contingencies for manipulating or accessing the reduced or additional partitions. With a boot source such as an EPROM, for example, such modifications are more complicated and time consuming because a new logic file and program modules must be programmed into the EPROM.

Figure 3:
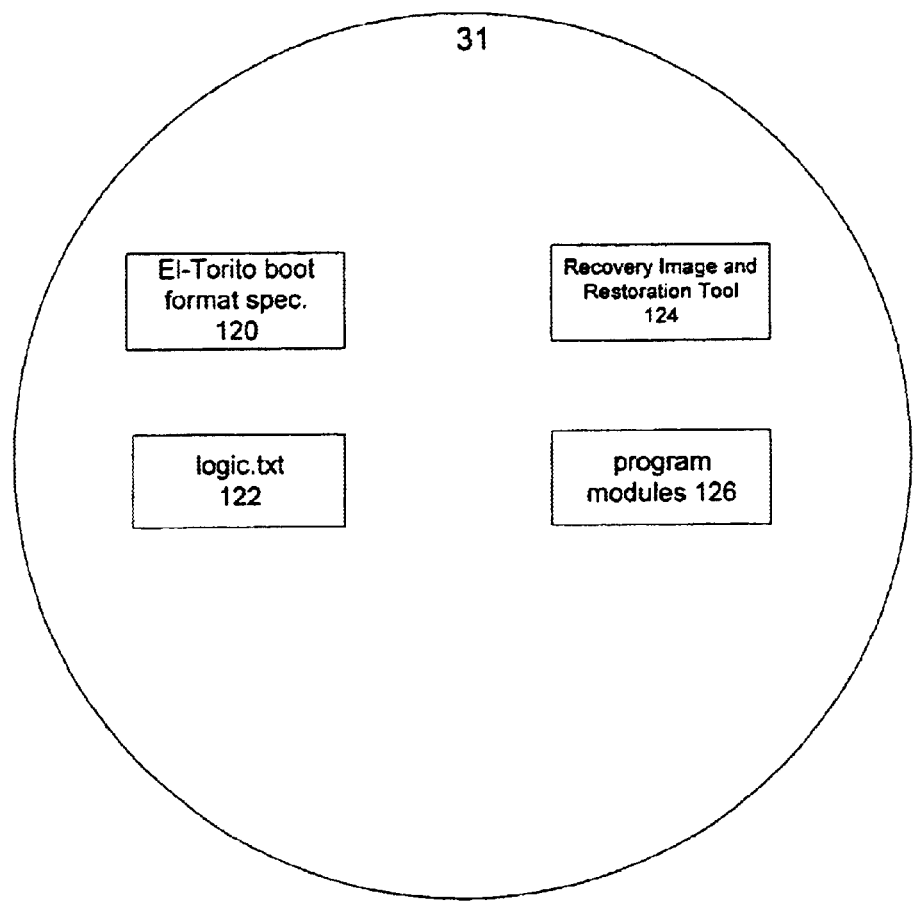
FIG. 3 is a schematic diagram of a CD-ROM used to initiate and control the boot process and the files stored thereon.

FIG. 3 is a schematic representation of a CD-ROM 31 that may be used to initiate and control the start-up and/or recovery process. The CD-ROM 31 includes the El Torito compliant program modules 120, logic.txt file 122, recovery image and restoration tools 124, and additional program modules 126.

The logic.txt file 122 may be a text file that contains the logical steps to be performed, either at start-up or during the recovery procedure after an error or failure, to boot the computer system to a known state. The logic.txt file 122 may also include information indicating the configuration of the hard disk 60. The program modules 126 perform the logical steps in the file logic.txt 122. The recovery image and restoration tools 124 are used to restore the system image on the hard disk 60 when necessitated by the logical steps in logic.txt 122.

Figure 4A:
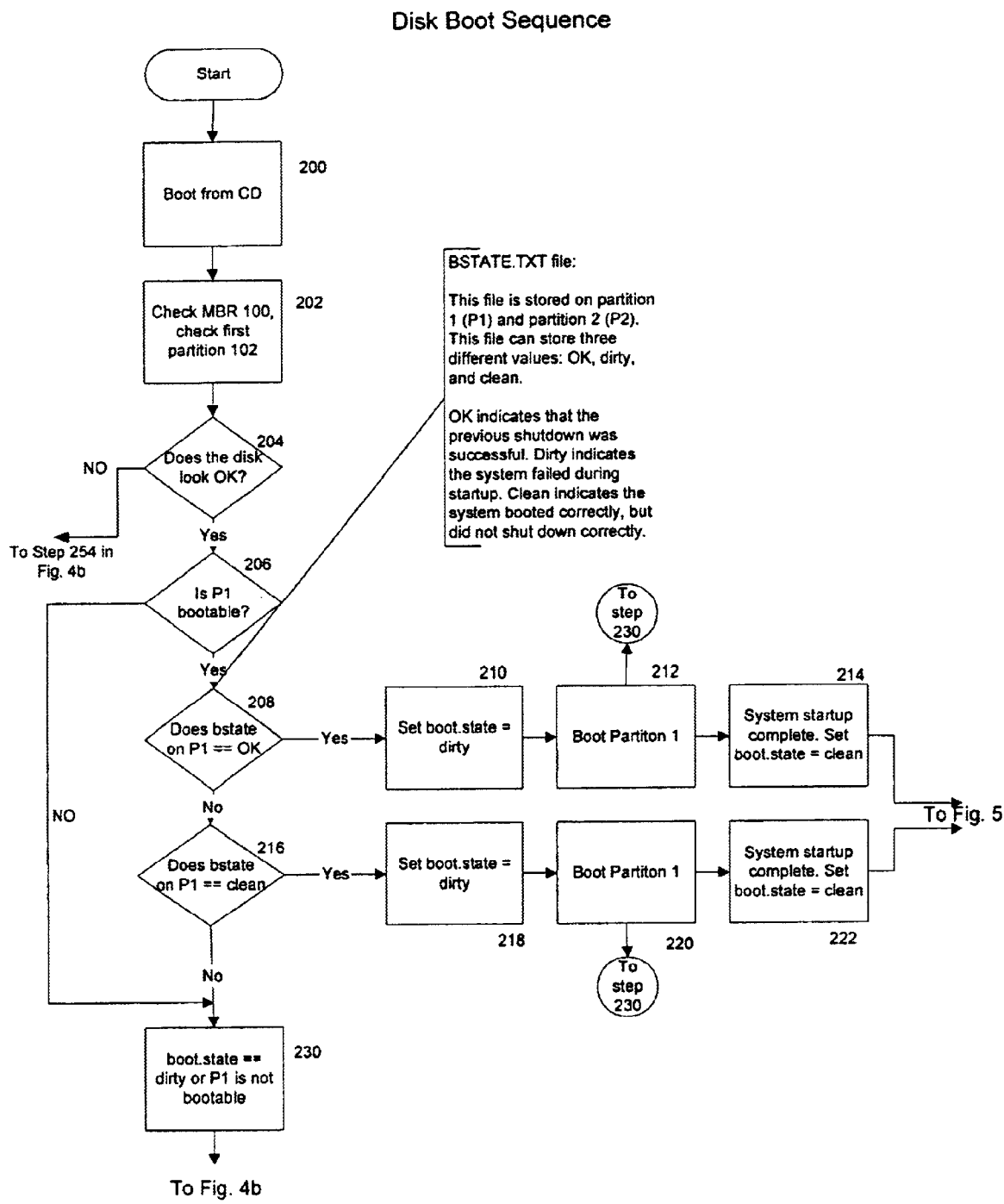
FIGS. 4a and 4b include a flowchart of exemplary logical steps performed during the boot process to boot the computer system to a known state.
Figure 4B:
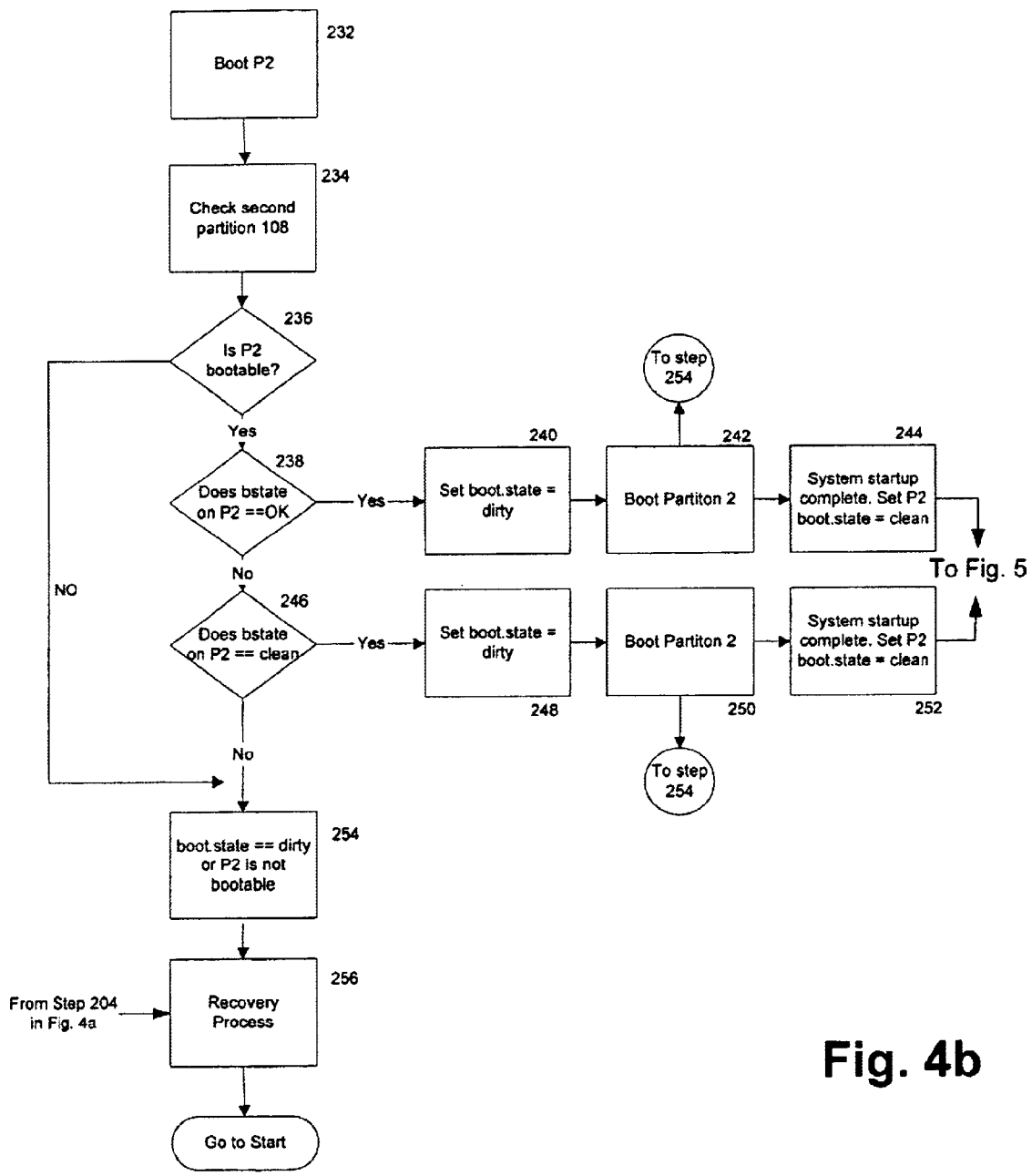

FIGS. 4a and 4b include a flowchart of logical steps performed to automatically boot the computer 20 to a known state either at start-up or after an error or failure while the system is running. While the flowchart in FIGS. 4a and 4b is exemplary of the logical steps executed to automatically boot the system to a known state, the invention is not limited to the exact steps discussed below and shown in the flowchart. The invention can use any series of logical steps that make the computer boot to a known state at start-up or in the event of a system failure.

At step 200, the boot process is initiated from the CD-ROM 31 that incorporates the El Torito compliant program modules 120. The El Torito compliant program modules start one or more program modules 126 that perform the logical steps specified in the logic.txt file 122. Creating the modules which accomplish the tasks specified in the logic.txt file 122 is within the ability of those with ordinary skill in the art. These modules may be written in any programming language, for example, assembly language or higher level languages such as C, C++, etc.

At step 202, the integrity of the MBR 100 and the active partition, i.e., partition P1, are verified. This step ensures that the MBR 100 has not, for example, been corrupted by a virus and that it contains a map of the hard disk 60, including the location of the partitions P1, P2. Additionally, this step verifies that partition P1 is intact and has not been corrupted or physically damaged.

If at step 204 the MBR 100 is damaged or corrupted, or if the data on the hard disk 60 is otherwise inaccessible, then the recovery process at step 256 on FIG. 4b is initiated, otherwise the boot process continues to step 206. If at step 206 partition P1 is not intact, or has been corrupted or physically damaged, then the bstate value of partition P1 is set equal to Dirty at step 230. If at step 206 partition P1 is intact and not damaged, then at step 208 the bstate value of partition P1 is determined from the file bstate.txt 106.

Every time the system boots, the result of the boot operation is written to the file bstate.txt 106 on partition P1. A redundant copy 112 of the bstate.txt file is also written on partition P2. For every partition on the hard disk 60, the file bstate.txt indicates one of three different values. The value "OK" indicates that the previous boot-up and shutdown of the system from that partition was successful. The value "Dirty" indicates that the system failed or experienced an error during the previous boot process from that partition. The value "Clean" indicates that during the previous boot process from that partition, the system booted successfully but did not shut down correctly. These values will collectively be referred to as "bstate values."

Step 208 determines whether the value stored in bstate.txt 106 for partition P1 is equal to OK. If the bstate value associated with partition P1 is OK, then the boot process will continue from partition P1 and at step 210 partition P1 is assigned a bstate value of Dirty. Until the boot process is successfully completed, the bstate value of partition P1 will remain Dirty. Thus, if the boot process fails to successfully complete from partition P1, the next time the system attempts to boot, the bstate value assigned to partition P1 will be Dirty, indicating a previously unsuccessful attempt to boot from partition P1. At step 212 the boot process continues from partition P1. Once the boot process is complete, at step 214 the bstate value of partition P1 in the file bstate.txt is changed to Clean.

If at step 208 the bstate value of partition P1 is not equal to OK, then step 216 determines whether the bstate value of partition P1 is equal to Clean. The bstate value of partition P1 is set as Dirty at step 230 if at step 216 the bstate value of partition P1 is not equal to Clean. When at step 216 the bstate value of partition P1 is Clean, the boot process continues from partition P1 and at step 218 the bstate value of partition P1 is set to Dirty. During step 220, the bstate value of partition P1 remains Dirty while the system completes the boot process from partition P1. Once the process is complete, at step 222 the bstate value of partition P1 is set to Clean.

As is evident from the above description, unless the bstate value of the first partition is equal to Dirty, the system will attempt to complete the boot process from partition P1. If the boot process cannot be completed from partition P1 during either step 212 or 220, then the bstate value of partition P1 will remain as Dirty and, starting at step 232, an attempt is made to boot the system from partition P2.

Referring to FIG. 4b, at step 232 partition P2 is designated as the active partition. Partition P2 contains a redundant copy 110 of the system image 104 stored on partition P1. Thus, if the boot process is successfully completed from partition P2, the computer system will be in the same known state as if it had completed the boot process from partition P1.

At step 234 the integrity of partition P2 is checked. Steps 236 through 254 in FIG. 4b are the same steps with respect to partition P2 as steps 206–230 for partition P1. Steps 236 to 254 determine if partition P2 is bootable. If partition P2 is bootable, then either at step 244 or step 252 the bstate value of partition P2 is set to Clean. If the boot process cannot be completed from partition P2, then the bstate value of partition P2 is set to Dirty and the recovery process at step 256 is initiated. The steps performed during step 256 are discussed in more detail with respect to FIG. 6. Once the recovery process at step 256 is completed, the system will once again initiate the boot process detailed on FIGS. 4a and 4b and boot the computer 20 to a known state.

Figure 5:
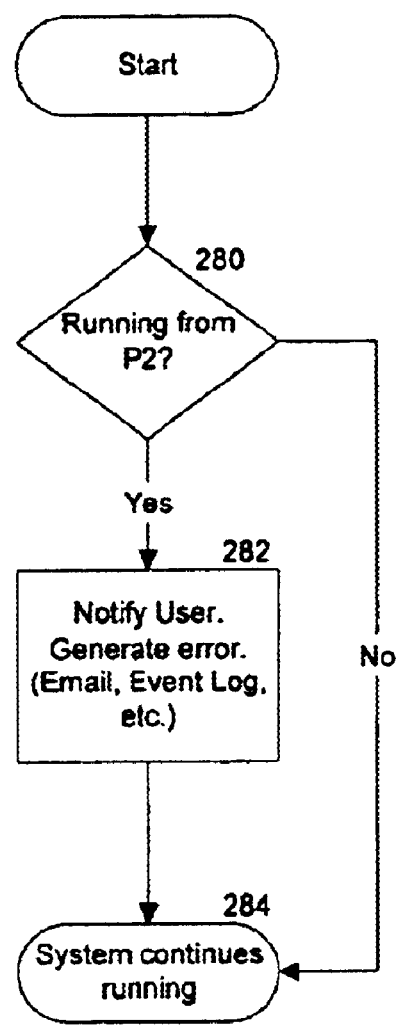
FIG. 5 is a flowchart of the steps performed to determine the active partition.

Referring to FIG. 5, after the computer system has successfully booted to a known state, at step 280, a check is initiated to determine whether the computer is running the system image on partition P1 or P2. The system continues operating at step 284 if the computer 20 is running the system image on partition P1. If the computer 20 is running the system image on partition P2 (which ordinarily would have been the back up or secondary partition), however, at step 282 the system generates an error signal, event log, email, cell phone or pager event, or similar prompt to notify a user, such as a network administrator, of this fact. The user will then be aware that there is a problem booting the system from partition P1 and can take any appropriate steps including, but not limited to, using the recovery tools 114 on partition P2 to attempt to diagnose and resolve any problems with partition P1. Step 282, however, is not limited to a user notification. The system may also perform, in addition to, or instead of, a user notification, self diagnostic and/or recovery procedures or any other procedure, program module or modification. Thereafter, at step 284, the system will continue running from partition P2.

Figure 6:
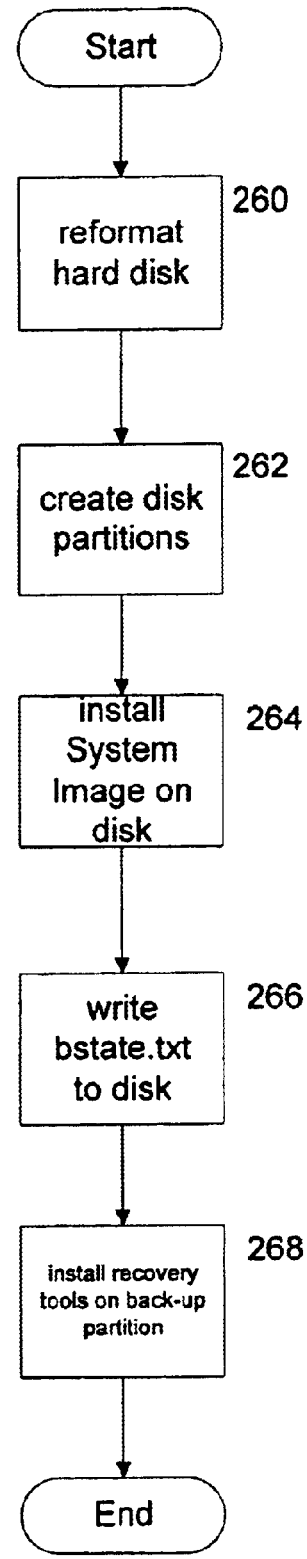
FIG. 6 is a flowchart setting forth in further detail the recovery process 256 shown in FIG. 4b.

The recovery step 256 in FIG. 4b is described in more detail with respect to the flowchart in FIG. 6. At step 260, the hard disk 60 is reformatted. If only one of the partitions P1 or P2 is unusable, however, the entire hard disk 60 need not be reformatted. When the MBR 100 is intact, the unusable partition may be individually reformatted without affecting the remainder of the hard disk.

The Master Boot Record 100 and partitions P1 and P2 are recreated at step 262 after the hard disk 60 is reformatted. As previously stated, the hard disk may have more than two partitions, but only one of the partitions is the active partition and the remaining partitions are back-up or secondary partitions. At step 264, redundant copies of the system image configuration 104, 110 are written to partitions P1, P2 on the hard disk 60. It is preferred that the system image configuration that is written to the partitions P1, P2 during the recovery process is the same as the system image configuration previously on the partitions, although the invention is not so limited. At step 266, redundant copies of the bstate.txt file, in which the bstate values of partitions P1 and P2 are set as OK, are written on partitions P1, P2, respectively. Additionally, at step 268 the recovery tools 114 may be written to partition P2. While it is preferable that during the recovery process redundant copies of the system image and bstate.txt file be restored on every partition, the system will still be recoverable to a known state if these files are restored on only one partition.

The recovery process 256, however, is not limited to the steps described above. Either through the recovery tools 114 on the partition P2 or recovery image and restoration tools 124 oh the CD-ROM 31, the system may perform any number of diagnostic, recovery, and/or modification procedures. For example, during the recovery process 256 the system may first attempt to identify and correct any errors that prevent the system from booting without reformatting the hard disk 60.

The logical steps performed during the boot and/or recovery process described and discussed in FIGS. 4a and 4b are modifiable. As previously stated, steps 236 through 254 with respect to partition P2 are essentially the same steps as 206 through 230 with respect to partition P1. If the hard disk 60 includes more or less than two partitions, the logical steps performed may be modified for the appropriate number of partitions to boot the computer 20 to a known state.

Figure 7:
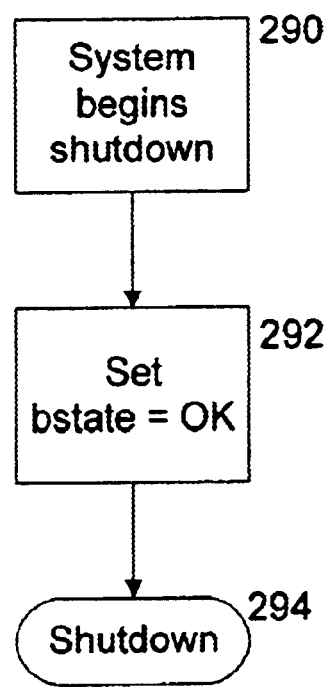
FIG. 7 is a flowchart of the steps performed when the computer system is shut down.

FIG. 7 includes a flowchart of the steps performed when the computer 20 is shut down. The shutdown process begins at step 290. If the shut down process is progressing properly, at step 292 the bstate value of the active partition is set to OK in the bstate.txt file and at step 294 the system shuts down.

The invention also provides for increased system reliability and recoverability when testing a new system image. As an illustrative example, a user can modify the system image 104 on partition P1 but not modify the system image 110 on partition P2. Such modifications may include, but are not limited to, adding a service pack to the system image, installing a later version of the system image, custom configuring the system image, etc. A boot process can then be initiated. If the modification prevents the system image on partition P1 from booting, the invention will automatically change partition P2 to the active partition and boot the unmodified system image 10. Similarly, if the modification causes the system image 104 on partition P1 to fail after a successful boot, the invention will automatically boot the system from the unmodified system image on partition P2.

The present invention is not limited to appliance servers. Indeed, the invention is applicable to any computing device or system.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for a computer system to boot itself to a known state in the event of a failure, the computer system having a physical storage device with at least a first partition and a second partition, each of the first and second partitions storing a redundant copy of a system image, the method comprising:
    initiating a system boot process from a source other than the physical storage device;
    determining whether or not the computer system can complete the boot process using the system image on the first partition;
    determining whether or not the computer system can complete the boot process using the system image on the second partition if it is determined the boot process cannot be completed using the system image on the first partition; and
    completing the boot process of the computer system using the system image on the second partition if it is determined that boot process can be completed from the second partition.

2. The method of claim 1 further comprising completing the boot process of the computer system using the system image on the first partition if it is determined that the boot process can be completed from the first partition.

3. The method of claim 1 further comprising restoring the system image on each of the first and second partitions if it is determined that the boot process cannot be completed using the system image stored on either the first partition or on the second partition.

4. The method of claim 3, wherein the step of restoring the system image on each of the first and second partitions is further comprised of:
    reformatting the physical storage device;
    recreating the first partition and the second partition on the storage device; and
    installing the system image configuration on each of the first and second partitions.

5. The method of claim 3, further comprising:
    completing the process of booting the computer system using the restored system image on one of the first and second partitions;
    determining which one of the first and second partitions the computer system has completed the boot process from; and
    generating a prompt indicative of the partition that the computer system has completed the boot process from.

6. The method of claim 5, wherein the step of generating a prompt comprises performing a modification to at least one of the system images on the at least two partitions.

7. The method of claim 1, wherein the step of initiating a system boot process is implemented from an optical disk in an optical disk drive.

8. The method of claim 7, wherein the optical disk is a CD-ROM and the optical disk drive is a CD-ROM drive.

9. The method of claim 8, wherein the CD-ROM is a self bootable CD-ROM.

10. The method of claim 9, wherein the CD-ROM incorporates the El Torito Bootable CD-ROM Format Specification.

11. The method of claim 1, wherein the step of determining whether or not the computer system can complete the boot process using the system image on the second partition is further comprised of verifying the integrity of the second partition.

12. The method of claim 11, wherein the step of determining whether or not the computer system can complete the boot process using the system image on the second partition is further comprised of obtaining the result of a previous attempt to complete the boot process using the system image on the second partition.

13. The method of claim 12, wherein the step of determining whether or not the computer system can complete the boot process using the system image on the second partition is further comprised of attempting to complete the boot process using the system image on the second partition.

14. The method of claim 1, wherein the step of determining whether or not the computer system can complete the boot process using the system image on the first partition is further comprised of verifying the integrity of a Master Boot Record and the first partition.

15. The method of claim 14, wherein the step of determining whether or not the computer system can complete the boot process using the system image on the first partition is further comprised of obtaining the result of a previous attempt to complete the boot process using the system image on the first partition.

16. The method of claim 15, wherein the step of determining whether or not the computer system can complete the boot process using the system image on the first partition is further comprised of attempting to complete the boot process using the system image on the first partition.

17. A computer system capable of reliably booting itself into a known state in the event of a failure, comprising: at least one computer readable storage device with at least a first partition and a second partition each storing a system image, wherein the system image stored on the second partition is a redundant copy of the system image stored on the first partition; a file on the computer readable storage device indicative of the status of a previous boot process performed by the computer system; and a second computer readable storage device for storing a boot specification, wherein a boot process is initiated using the boot specification stored on the second computer readable storage device.

18. The computer system of claim 17 further comprising a logic file containing logical steps comprising the boot process.

19. The computer system of claim 18 further comprising at least one program module for performing at least one of the logical steps comprising the boot process.

20. The computer system of claim 19 further comprising at least one program module for restoring the system image on at least one of the partitions.

21. The computer system of claim 20, wherein the logic file, the program module for performing at least one of the logical steps comprising the boot process, and the program module for restoring the system image on at least one of the partitions are stored on the second computer readable storage device.

22. The computer system of claim 21, wherein the at least one readable storage device is a hard disk and the second computer readable device is a CD-ROM.

23. A method for a computer system to boot itself to a known state in the event of a failure, the computer system having at least one physical storage device with at least a first partition and a second partition, each of the first and second partitions containing a redundant copy of a system image, the method comprising:

executing steps stated in a logic file on a boot source other than the physical storage device with the first and second partitions, wherein the logic file contains one or more logical steps that may be performed at boot time comprising,
(1) verifying the integrity of a Master Boot Record,
(2) determining whether the boot process can be completed using the system image on the first partition,
(3) determining whether the boot process can be completed using the system image on the second partition, and
(4) restoring the system image on the at least one of the first and second partitions if the boot process cannot be completed from either the first or the second partition; and booting the system to a known state as a result of executing the logical steps in the logic file on the boot source other than the physical storage device.

24. The method of claim 23, wherein the boot source is a self bootable CD-ROM.

25. The method of claim 24, wherein the CD-ROM incorporates the El Torito Bootable CD-ROM Format Specification.

26. The method of claim 23, wherein the logical step of determining whether the boot process can be completed using the system image on the first partition is further comprised of:

verifying the integrity of the first partition; and
obtaining the result of a previous attempt to complete the boot process using the system image on the first partition.

27. The method of claim 26, wherein the logical step of determining whether the boot process can be completed using the system image on the second partition is further comprised of:

verifying the integrity of the second partition; and
obtaining the result of a previous attempt to complete the boot process using the system image on the second partition.

28. The method of claim 27, wherein the logical step of restoring the system image on the at least one physical storage device is further comprised of:

reformatting the physical storage device;
recreating the first and second partitions on the storage device; and
installing the system image configuration on at least one of the first and second partitions.

29. A computer-readable medium having computer executable instructions for ensuring that a computer system boots to a known state, wherein the computer system has at least one physical storage device with at least a first and a second partition and only one of the at least first and second partitions can be an active partition, which, when executed, comprise:

determining whether the boot process can be completed from the first partition, wherein the first partition stores a system image and is the active partition;
designating the second partition the active partition if the boot process cannot be completed from the first partition; and determining whether the boot process can be completed from the second partition, wherein the second partition stores a redundant copy of the system image on the first partition.

30. The computer-readable medium of claim 29, wherein the computer executable instructions for ensuring that the computer system boots to a known state, when executed, further comprise:
completing the process of booting the computer system to a known state using the redundant copy of the system image on the second partition.

31. The computer-readable medium of claim 29, wherein the computer executable instructions for ensuring that the computer system boots to a known state, when executed, further comprise:
restoring the system image on at least one of the first and second partitions if the boot process cannot be completed using the system image stored on either the first partition or the second partition.

32. The computer-readable medium of claim 31, wherein the computer executable instructions for ensuring that the computer system boots to a known state, when executed, further comprise:
completing the process of booting the computer system to a known state using the system image restored on the at least one of the first and second partitions.

33. A method for a computer system to boot itself to a known state in the event of a failure, the computer system having a physical storage device with at least a first partition and a second partition, each of the at least first and second partitions containing a redundant copy of a system image, the method comprising:
initiating a system boot process from a source other than the physical storage device;
determining if the computer system boot process can be completed using the system image on one of the first and second partitions; and
completing the process of booting the computer system using the system image on one of the at least first and second partitions that is determined from which the boot process can be completed.

34. The method of claim 33 further comprising restoring the system image on at least one of the first and second partitions if it is determined that the boot process cannot be completed using the system image on either of the first or second partitions.

35. The method of claim 34, wherein the step of restoring the system image on each of the first and second partitions is further comprised of:
reformatting the physical storage device;
recreating the first and second partitions on the storage device; and
installing the system image configuration on each of the first and second partitions.

36. The method of claim 34, further comprising:
completing the process of booting the computer system using the restored system image on one of the first and second partitions;
determining which one of the first and second partitions the computer system completed the boot process from; and
generating a prompt indicative of the partition that the computer system completed the boot process from.

37. The method of claim 33, wherein the step of initiating a system boot process is implemented from an optical disk in an optical disk drive.

38. The method of claim 37, wherein the optical disk is a CD-ROM and the optical disk drive is a CD-ROM drive.

39. The method of claim 38, wherein the CD-ROM is a self bootable CD-ROM.

40. The method of claim 39, wherein the CD-ROM incorporates the El Torito Bootable CD-ROM Format Specification.

41. The method of claim 33, wherein the step of determining whether or not the computer system boot process can be completed using the system image on one of the first and second partitions is further comprised of:
verifying the integrity of a Master Boot Record and the first partition.

42. The method of claim 41, wherein the step of determining whether or not the computer system boot process can be completed using the system image on one of the first and second partitions is further comprised of:
obtaining the result of a previous attempt to complete the boot process using system image on the first partition; and
attempting to complete the boot process using the system image on the first partition.

43. The method of claim 33, wherein the step of determining whether or not the computer system boot process can be completed using the system image on one of the first and second partitions is further comprised of:
verifying the integrity of the second partition.

44. The method of claim 43, wherein the step of determining whether or not the computer system boot process can be completed using the system image on one of the first and second partitions is further comprised of:
obtaining the result of a previous attempt to complete the boot process using the system image on the second partition; and
attempting to complete the boot process using the system image on the second partition.

45. A method for a computer device to reliably boot itself to a known state, the computer device having a physical storage device with at least a first partition storing a system image, the method comprising:
initiating a system boot process from a source other than the physical storage device;
determining whether or not the boot process can be completed using the system image on the physical storage device; and
restoring the system image on the physical storage device if the boot process cannot be completed from the physical storage device.

46. The method of claim 45 further comprising completing the boot process from the restored system image on the physical storage device.

47. The method of claim 45, wherein the step of initiating a system boot process is implemented from an optical disk in an optical disk drive.

48. The method of claim 47, wherein the optical disk is a CD-ROM and the optical disk drive is a CAROM drive.

49. The method of claim 48, wherein the CD-ROM is a self bootable CD-ROM incorporating the El Torito Bootable CD-ROM Format Specification.

50. The method of claim 45, wherein the step of determining whether or not the boot process can be completed using the system image stored on the physical storage device is further comprised of:
verifying the integrity of a Master Boot Record and the first partition.

51. The method of claim 50, wherein the step of determining whether or not the boot process can be completed using the system image on the physical storage device is further comprised of:
   obtaining the result of a previous attempt to complete the boot process using the system image on the first partition; and
   attempting to complete the boot process using the system image on the first partition.

52. The method of claim 45, wherein the step of restoring a system image on the physical storage device is further comprised of:
   reformatting the physical storage device;
   recreating the at least first partition on the storage device; and
   installing the system image configuration on the at least first partition.

53. A computer system capable of reliably booting itself to a known state, comprising: at least a first and a second computer readable storage device, each of the at least first and second storage devices storing a system image, wherein the system image stored on the second storage device is a redundant copy of the system image stored on the first storage device; a file on the first storage device indicative of the status of a previous boot process performed by the computer system; and a third computer readable storage device for storing an initial boot specification, wherein a boot process is initiated using the boot specification stored on the third computer readable storage device.

54. The computer system of claim 53, further comprising a logic file containing logical steps comprising the boot process.

55. The computer system of claim 54, further comprising at least one program module for performing the logical steps comprising the boot process.

56. The computer system of claim 55, further comprising at least one program module for restoring the system image on at least one of the partitions.

57. The computer system of claim 56, wherein the logic file, the program module for performing the logical steps comprising the boot process, and the program module for restoring the system image are stored on the third computer readable storage device.

58. The computer system of claim 57, wherein the at least first and second computer readable storage device are hard disks and the third computer readable device is a CD-ROM.

59. A method for ensuring that a computing device can boot to a known state in the event that an error occurs as a result of a modification to a system image stored on the computing device, the computing device having a physical storage device with at least a first partition and a second partition, each of the first and second partitions containing a redundant copy of the system image, the method comprising:
   modifying the system image on the first partition such that the system image on the second partition is no longer redundant to the system image on the first partition;
   initiating a system boot process from a source other than the physical storage device with the first and second partitions;
   determining whether or not the computer system can complete the boot process using the modified system image on the first partition; and
   completing the boot process using the system image on the second partition if the boot process cannot be completed using the modified system image on the first partition.

60. The method of claim 59, wherein the step of modifying the system image on the first partition is comprised of adding a service pack to the system image.

61. The method of claim 59, wherein the step of modifying the system image on the first partition is comprised of installing a later version of the system image.

62. The method of claim 59, wherein the step of modifying the system image on the first partition is comprised of custom configuring the system image.

* * * * *